(12) United States Patent
Di Carlo et al.

(10) Patent No.: US 7,492,872 B1
(45) Date of Patent: Feb. 17, 2009

(54) METHOD FOR GIVING NOTIFICATION OF A MESSAGE TO A SUBSCRIBER

(75) Inventors: Vincenzo Scotto Di Carlo, München (DE); Egon Schulz, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/538,792

(22) Filed: Mar. 30, 2000

Related U.S. Application Data

(63) Continuation of application No. PCT/DE98/02629, filed on Sep. 7, 1998.

(30) Foreign Application Priority Data

Sep. 30, 1997 (DE) ................. 197 43 241

(51) Int. Cl.
H04M 1/64 (2006.01)
(52) U.S. Cl. ................. 379/88.12; 379/88.25
(58) Field of Classification Search ... 379/88.12–88.14, 379/88.08, 88.11
See application file for complete search history.

(56) References Cited

U.S. PATENT DOCUMENTS

| | | | |
|---|---|---|---|
| 4,837,798 A | | 6/1989 | Cohen et al. |
| 5,742,905 A | * | 4/1998 | Pepe et al. .................. 455/461 |
| 5,802,166 A | * | 9/1998 | Garcia et al. ................ 379/372 |
| 5,889,839 A | * | 3/1999 | Beyda et al. ............. 379/88.12 |
| 5,966,663 A | * | 10/1999 | Gleason ..................... 455/466 |
| 5,987,100 A | * | 11/1999 | Fortman et al. .......... 379/88.14 |
| 5,995,594 A | * | 11/1999 | Shaffer et al. ............ 379/88.12 |
| 6,233,318 B1 | * | 5/2001 | Picard et al. ............. 379/88.17 |
| 6,333,973 B1 | * | 12/2001 | Smith et al. ............. 379/88.12 |

FOREIGN PATENT DOCUMENTS

| | | |
|---|---|---|
| DE | 43 32 057 A1 | 3/1995 |
| DE | 44 14 968 A1 | 11/1995 |
| EP | 0 823 809 A2 | 2/1998 |

OTHER PUBLICATIONS

Euisik Yoon et al.: "An Integrated Mass Flow Sensor with on-Chip CMOS Interface Circuitry", IEEE Transactions on Electron Devices, vol. 39, No. 6, Jun. 1992, pp. 1376-1385.
S. Middelhoek et al.: "Silicon sensors", Meas. Sci. Technol. 6 (1995), pp. 1641-1658.
Published International Application No. WO 92/14330 (Lahtinen et al.), dated Aug. 20, 1992.
Published International Application No. WO 97/33421 (Pepe et al.), dated Sep. 12, 1997.

* cited by examiner

*Primary Examiner*—Curtis Kuntz
*Assistant Examiner*—Joseph T Phan
(74) *Attorney, Agent, or Firm*—Laurence A. Greenberg; Werner H. Stemer; Ralph E. Locher

(57) ABSTRACT

In a method for giving notification of a message to a subscriber who is registered with at least two message services, each message service indicates to a common notification server at least the presence of a new message for the subscriber on that respective message service. The notification server transmits to at least one terminal of the subscriber a notification which includes at least the fact that a new message is present and identifies the message service in which the message is present. It is thus possible for a subscriber who is registered with a plurality of message services to be informed of the presence of a new message in a very reliable, quick and problem-free way.

15 Claims, 2 Drawing Sheets

METHOD FOR GIVING NOTIFICATION OF A MESSAGE TO A SUBSCRIBER

CROSS-REFERENCE TO RELATED APPLICATION

This is a continuation of copending International Application PCT/DE98/02629, filed Sep. 7, 1998, which designated the United States.

BACKGROUND OF THE INVENTION

Field of the Invention

The invention lies in the telecommunications field. More specifically, the invention relates to a method for providing notification of a message to a subscriber who is registered with at least two message services.

In a large number of communication networks, for example ISDN networks, GSM networks, private networks and data networks, message services are available for voice messages or text messages. If a message arrives on one of these message services, the subscriber is suitably informed, for example by means of a visual display and/or an audible indicating tone.

The message services, however, are independent of one another and signal the arrival of a message only on specific terminals. For example, a message in the ISDN service is indicated only on the fixed ISDN telephone of the user, or a GSM message is only indicated on the GSM terminal. The user may therefore fail to receive important messages if he or she does not have access to the respective terminal at a given time. In the case of fixed terminals, the user cannot always be present at the terminal. The same applies to terminals such as cordless telephones which operate only in a spatially very limited area. In theory, the user could continuously carry mobile terminals, such as radiotelephones, on his or her person, but this is impractical if there are a plurality of message services and a correspondingly large number of mobile terminals.

Many message services provide a remote access facility. For example, an e-mail subscriber can usually dial into a commercial data network using a computer and a modem and check the mailbox. Such an interrogation by remote access does not, however, ensure that the user receives important messages immediately. Moreover, each interrogation involves a certain degree of expenditure of time and money. This is particularly disadvantageous if an interrogation only produces the result that there are no messages.

SUMMARY OF THE INVENTION

The object of the invention is to provide method for notifying a subscriber of a message which overcomes the above-noted deficiencies and disadvantages of the prior art devices and methods of this kind, and which permits even a subscriber who is registered with a plurality of message services to be informed of the presence of a new message in a way which is as reliable, quick and problem-free as possible.

With the above and other objects in view there is provided, in accordance with the invention, a method of notifying a subscriber of a plurality of message services of a message:

indicating, with each of a plurality of message services, to a common notification server a presence of a new message for a subscriber on the respective message service; and transmitting, with the notification server, to at least one terminal of the subscriber a notification indicating that a new message is present and in which message service the new message is present.

The invention is based on the basic idea of providing a common notification server to which each message service indicates the presence of a new message for the subscriber. The notification server constitutes, as it were, the connection between the plurality of message services by transmitting a suitable notification to at least one terminal of the subscriber. This notification includes at least the information that a new message is present and the message service in which this message is present.

The invention makes it possible to pass on information relating to the presence of new messages to a suitable subscriber terminal or to a plurality of terminals of the subscriber. For example, the notifications may be transmitted to a single dual-mode radiotelephone of the subscriber. The subscriber then only needs to carry this one device on his person in order to be continuously up to date in terms of new messages. If the notifications are directed to a plurality of terminals of the subscriber, the subscriber needs to be near to just one of these terminals, for example either to his fixed office telephone or to his home telephone. In all cases, the subscriber receives the desired information quickly and reliably.

The notification server which is provided according to the invention supports all those message services of the subscriber on which a notification of newly incoming messages is to be given. This does not necessarily mean that the notification server is physically a single module. Instead, the notification server may be formed from a plurality of computers or other systems which are networked to one another. The only relevant factor is that the interaction of these systems makes available the functions of the notification server.

In accordance with an added feature of the invention, if a message service indicates the presence of a new message, the notification server stores the data originating from the message service, until the respective notification has been transmitted successfully. The data are stored at least partially in the notification server, and at least until the respective notification is successfully transmitted. This increases the reliability of the method, because a notification can be transmitted repeatedly to a terminal of the subscriber. Moreover, in this case, it is also possible to provide an access facility of the subscriber to stored notifications from any terminals—after an authorization check.

In accordance with an additional feature of the invention, the notification server transmits the notification to all terminals of the subscriber.

In accordance with an alternative feature of the invention, the notification server transmits the notification to the terminal(s) selected by the subscriber to receive the notification.

The notification server can transmit to the subscriber only the information indicating the message service in which a new message is present. However, the subscriber preferably receives further information which the notification server obtains from a message header information item. The message header information item can be transmitted to the notification server by the message services either whenever a new message is present or only on request.

In accordance with another feature of the invention, the subscriber selects a terminal by transmitting a control information item from that terminal to the notification server.

In accordance with a further feature of the invention, a message header information item is transmitted with each message service to the notification server when a new message is present, and the message header information is transmitted with the notification server at least partially to at least one subscriber terminal that is capable, at least partially, of outputting the message header information.

In accordance with again an added feature of the invention, the method further comprises, in response to a request by the notification server, transmitting with each message service a message header information item to the notification server, and transmitting the message header information item with the notification server at least partially to at least one subscriber terminal enabled to output the message header information at least partially.

In accordance with again an additional feature of the invention, the notification server firstly performs an authorization check in response to a subscriber request from any terminal, and then transmits the notifications present to the terminal.

In accordance with again another feature of the invention, the notification server processes the data originating from the message services for generating the notifications transmitted to the subscriber. Such processing may include filtering, ordering, and/or formatting the data.

In accordance with a concomitant feature of the invention, the notifications are transmitted by means of a signaling operation to the at least one terminal of the subscriber and/or by a call set-up.

Other features which are considered as characteristic for the invention are set forth in the appended claims.

Although the invention is illustrated and described herein as embodied in a method of notifying a subscriber of a message, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
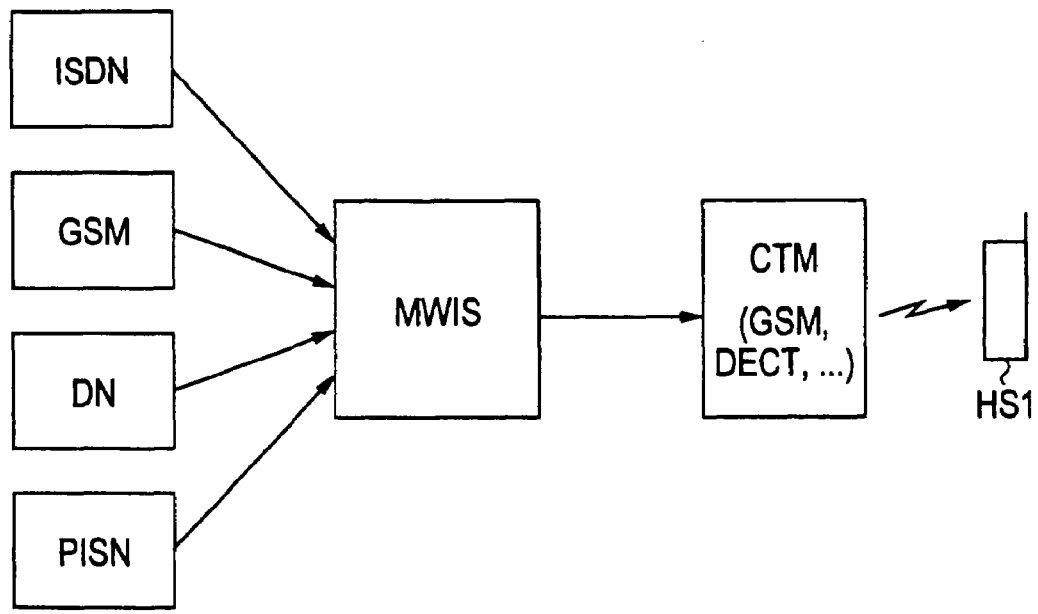
FIG. 1 is a schematic view of a variety of communications paths in a first exemplary embodiment of the invention.

Referring now to the figures of the drawing in detail and first, particularly, to FIG. 1 thereof, there is seen a notification server MWIS which receives information from message services of a plurality of communication networks, namely an ISDN network (ISDN=Integrated Services Digital Network), a GSM network (GSM=Global System for Mobile Communications), a data network DN, and a private network referred to below as PISN.

Fixed ISDN telephones are provided as terminals in the ISDN network, and message services are available for text messages and voice messages. The GSM network has GSM cell phones (radiotelephones) as terminals. Message services available are a short text message service (SMS=Short Message Service) and various provider-dependent voice message services. Cord-bound or cordless telephones may be connected to the private network PISN; cordless telephones in particular according to the DECT standard (DECT=Digital Enhanced Cordless Communications). A short text message service is also available for DECT telephones, and further message services may be provided depending on the performance features of the private network PISN. Finally, an e-mail service for electronic mail, with which any desired digital data may be sent, is made available in the data network DN. The data network DN may be a commercial data network. Computers which are connected locally to the data network DN may be used to access the e-mail service. In addition, it is possible to dial in to the data network DN by means of a telephone network using a portable computer.

The message services specified—and further services in alternative embodiments—indicate to the notification server MWIS any message which has newly arrived for a subscriber, by transmitting an appropriate information item to the notification server MWIS. The method of data transmission depends on the message service. For example, a message display from the GSM network is given by means of a specific message indicator (MWI=Message Waiting Indication) or by means of a short text message transmitted to the notification server MWIS. Such message indications may be transmitted in the form of an e-mail from the data network DN to the notification server MWIS. If the message server is connected to the ISDN network or another network by means of an ISDN line, suitable signaling operations may be transmitted on the D channel. These and other communications possibilities are known per se and are to a certain extent standardized. For this reason they will not be described in detail here.

In the first exemplary embodiment described here, the notification server MWIS receives from the individual message services merely the information that a new message is present. In addition, the notification server MWIS can determine the transmitting message service either from the port via which the information is received or from the information. In the first exemplary embodiment described here, the notification server MWIS does not receive any further information from the message services. In alternative embodiments, on the other hand, further information, for example message header information which contains details on the sender of the message, the reference, transmission date and time and so on is transmitted to the notification server MWIS. It is also possible for the message header information to be transmitted to the notification server MWIS only in response to a particular request by it.

The notification server MWIS stores the information received from the message services and generates for each message display a notification which indicates to the subscriber the presence of a message and indicates the message service in which this message is present. In the first two exemplary embodiments shown in FIG. 1, this notification is a GSM-SMS message which is transmitted via a network according to the CTM Phase 2 standard (CTM=Cordless Terminal Mobility) on a network to a dual-mode radiotelephone HS1 of the subscriber. The dual-mode radiotelephone HS1 is a combination of a GSM and a DECT telephone which the subscriber can carry continuously on his person. The CTM network comprises both GSM networks and DECT networks, and the GSM-SMS notification emitted by the notification server is automatically directed within these networks to the dual-mode radiotelephone HS1. The subscriber can therefore receive the notification within a very large spatial area. In response to receiving the notification, the subscriber can, if considered suitable or necessary, retrieve the message from the message service specified in the notification.

Figure 2:
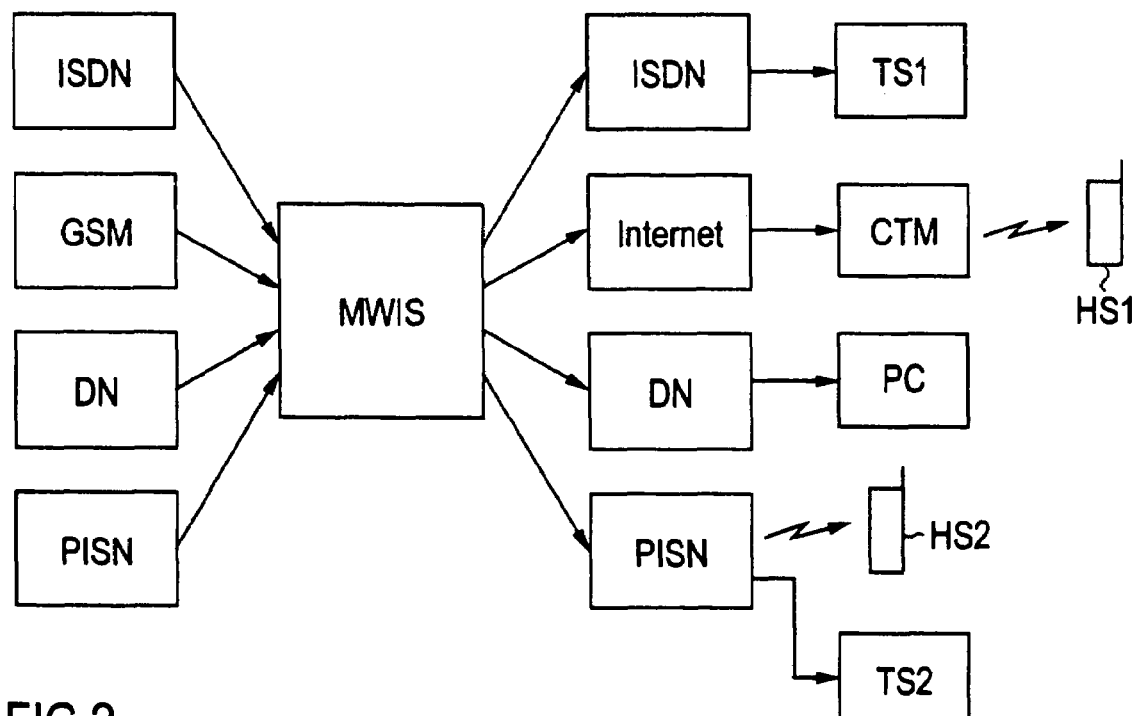
FIG. 2 is a schematic view of the communications paths in a second exemplary embodiment.

Referring now to FIG. 2, in the second exemplary embodiment the notification server MWIS receives the message indications from the message services in the manner already described. However, in contrast to FIG. 1, a plurality of subscriber terminals to which the message notifications can be transmitted are provided here.

More precisely, the notification server MWIS can transmit a notification by means of a signaling operation on the ISDN-D channel via the ISDN network to a line-bound ISDN telephone TS1 of the subscriber. A notification transmission via the CTM network to the dual-mode radiotelephone HS1 already shown in FIG. 1 is likewise possible. However, in FIG. 2, the notification server MWIS does not access the CTM network directly, but rather the notification is output onto the Internet, and passed on from there as a GSM-SMS message to the CTM network. In addition, the notification server is configured to transmit notifications in the form of e-mail messages via the data network DN to a personal computer PC of the user. Finally, the notification server can also transmit notifications in the form of signaling operations, text or synthesized voice over the private network PISN to a DECT telephone HS1 and a fixed telephone TS2. The distribution of incoming notifications between the DECT telephone HS1 and the fixed telephone TS2 is carried out by means of the private network PISN.

In the second exemplary embodiment described here, the notification server MWIS passes on, for each incoming message indication, a corresponding notification to all the connected terminals of the subscriber. The subscriber can thus always be reached if he has access to one of these terminals. In the case of the system shown in FIG. 2, the notification server MWIS is connected, to a certain extent, to the same networks on its input sides and output sides. In this case, the notification is not transmitted to that terminal from which the message of which there was notification originates.

In order to transmit the notification to the ISDN telephone TS1, a message indication (MWI) according to the ISDN standard is transmitted. The number of waiting messages and their type may be specified here. In the private network PISN, it is possible to transmit a message indication similarly to in the ISDN network if the private network PISN and the DECT telephone HS2 support the CAP standard (CAP=CTM Access Profile). In the GSM network, a short text message is, as already described, transmitted, so that a visual and/or audible message indication is also triggered on the GSM telephone HS1. In alternative embodiments, the notification can be transmitted at all terminals which support a voice transmission, by means of a call set-up. The subscriber then receives a call in which he is informed of the presence of a message in a specific message service using synthetic voice.

In a further alternative embodiment, the notification is not transmitted to all the terminals of the subscriber but rather just to one terminal or to some of these terminals. The selection of the terminals can be carried out centrally, for example by means of a system administrator. However, it is also possible for the subscriber to make the selection himself. To do this, the subscriber can transmit a suitable control information item to the notification server from one of his terminals. The control information item can include the addresses (for example telephone numbers) of those terminals to which the notifications are to be directed. As an alternative, it is possible to provide for the notification server MWIS to direct future messages only to the terminal, or also to the terminal, from which the last received control information item originates. The subscriber can then register a terminal as a notification receiver by means of a simple selection of the notification server.

In further alternative embodiments, in contrast with the representation of FIG. 2, other or additional communications paths and terminals are provided. In particular, possibilities are provided which permit the subscriber to interrogate at the notification server MWIS notifications which are present for him or her from any desired terminal. For example, it may be provided that the subscriber can dial the notification server MWIS from a public telephone and then receive the notifications by means of voice output. If the subscriber uses a mobile computer with a modem or an Internet access in order to access the notification server MWIS directly, the notifications are output in text form. In all these cases, an authorization check of the subscriber is, as a rule, necessary, for example by means of a password.

Figure 3:
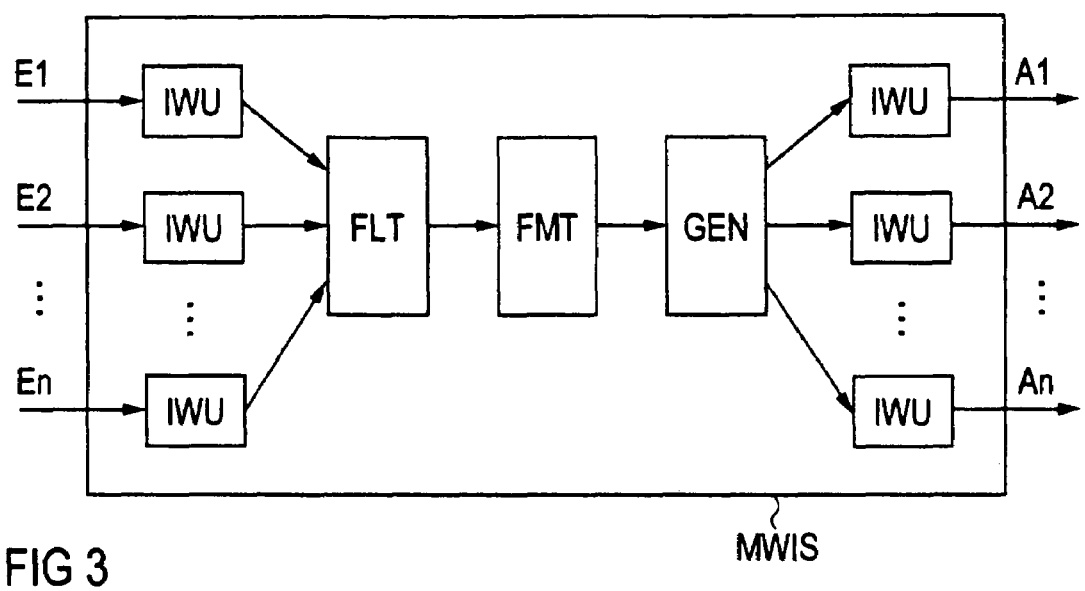
FIG. 3 is a schematic view of the data flow in a notification server in a third exemplary embodiment.

The data flow in a notification server MWIS is illustrated in more detail in FIG. 3. As already described, the notification server MWIS has inputs E1, E2, . . . , En for message indications of message services and outputs A1, A2, . . . , An for notifications to terminals of the subscribers. The inputs and outputs are connected, as illustrated in FIGS. 1 and 2 to different communications networks and message services. For each input and output, an interface adapter device IWU (Interworking Unit) which performs the necessary adaptation functions for the exchange of messages with the message services is provided for each input and output in the notification server MWIS.

The notification server MWIS in FIG. 3 is provided for use in a third exemplary embodiment of the invention in which at least some of the message services transmit a comprehensive message header information item to the notification server MWIS when a new message is present.

The message indications which are received from the message services are directed to a filter device FLT by the interface adapter devices IWU. The filter device FLT determines, according to predefined criteria or criteria which are set by the subscriber, the new messages for which a notification is to be output to the user. Depending on what types of information the message indications contain, such criteria may be, in particular, the priority of the new messages, the identity, determined by the name or the telephone number, of the transmitter or keywords in a title indication or reference indication of the message header information. For example, the subscriber can stipulate that no notification is to be generated for messages from certain senders, or that a notification is to be generated only for messages from certain senders. In alternative embodiments, the filter device FLT can also order the incoming message indications according to their priority.

The filtered message indications are then fed to a formatting device FMT. The formatting device FMT extracts from the message indications that information which the subscriber is to receive with the notification. This can be stipulated in advance or by the subscriber. For example, the subscriber can determine that he wishes to receive only the sender name and the title of the message. In alternative embodiments, the formatting device FMT can make available a plurality of formatting patterns which can be selected as a function of the capabilities of the terminal or of the terminals to which the notification is to be transmitted. For example it is possible to stipulate that a notification which is transmitted as a short text message will have more information than a message indication according to the ISDN standard. In further alternative embodiments, the terminals which are provided for the reception of the notification can be selected as a function of the information to be transmitted with the notification.

The actual notifications are ultimately generated by a generating device GEN. Depending on the type of terminal to which the notification is transmitted, the generating device GEN produces a text notification or a voice notification in synthetic language from the information originating from the formatting device FMT. The message which is output by the generating device GEN is ultimately output via the interface adapter device IWU and the communications networks connected to the notification server MWIS to the desired terminal or the desired terminals of the subscriber.

We claim:

1. A method of notifying a subscriber of a plurality of message services of a message, which comprises:

indicating, with each of the plurality of different message services, to a notification server common to all of the different message services, a presence of a new message for the subscriber on the respective message service;

selecting, by the subscriber, at least one terminal from a plurality of terminals of the message services; and transmitting a notification, with the notification server, to the at least one selected terminal, in contrast to transmitting the message, the transmitted notification indicating that a new message is present and in which message service the new message is present.

2. The method according to claim 1, which comprises, if a message service indicates the presence of a new message, storing with the notification server the data originating from the message service, until the respective notification has been transmitted successfully.

3. The method according to claim 1, wherein the transmitting step comprises transmitting with the notification server the notification to all terminals of the subscriber.

4. The method according to claim 1, wherein the transmitting step comprises transmitting with the notification server the notification to the at least one terminal selected by the subscriber from a plurality of terminals.

5. The method according to claim 4, wherein the subscriber selects the at least one terminal by transmitting a control information item from the respective terminal to the notification server.

6. The method according to claim 1, which comprises transmitting with each message service a message header information item to the notification server when a new message is present, and transmitting the message header information with the notification server at least partially to the at least one terminal selected, at least partially, to output the message header information.

7. The method according to claim 1, which comprises, in response to a request by the notification server, transmitting with each message service a message header information item to the notification server, and transmitting at least partially the message header information item with the notification server to the at least one terminal selected to output the message header information.

8. The method according to claim 1, which comprises, in response to a subscriber request from any terminal, firstly performing an authorization check with the notification server and then transmitting the notifications present to the terminal.

9. The method according to claim 1, which comprises processing with the notification server the data originating from the message services for generating the notifications transmitted to the subscriber.

10. The method according to claim 9, wherein the processing step comprises selecting one or more processes from the group consisting filtering, ordering, and formatting the data.

11. The method according to claim 1, wherein the transmitting step comprises transmitting the notifications by means of a signaling operation to the at least one terminal of the subscriber.

12. The method according to claim 1, wherein the transmitting step comprises transmitting the notifications by means of a call set-up to the at least one terminal of the subscriber.

13. The method according to claim 1, wherein the transmitting step further comprises transmitting only a notification to the at least one previously selected terminal.

14. The method according to claim 1, wherein the transmitting step further comprises transmitting a notification only indicating that a new message is present and in which message service the new message is present.

15. A method of notifying a subscriber of a plurality of message services on a plurality of different networks of a message, the method comprising the steps of:

indicating, with each of the plurality of different message services, to a notification server common to all of the different message services on the plurality of different networks, a presence of a new message for the subscriber on the respective message service;

selecting, by the subscriber, at least one terminal from a plurality of terminals of the message services; and transmitting a notification, with the notification server, to the at least one selected terminal, in contrast to transmitting the message, the transmitted notification indicating that a new message is present and in which message service the new message is present.

* * * * *